E. G. GODFREE.
ELECTROMECHANICAL SELECTOR.
APPLICATION FILED MAY 7, 1910.

997,990.

Patented July 18, 1911.
4 SHEETS—SHEET 1.

Witnesses.
R. E. Barry.
J. K. Moore.

Inventor.
Ernest G. Godfree
By
Whitaker Prewitt,
attys.

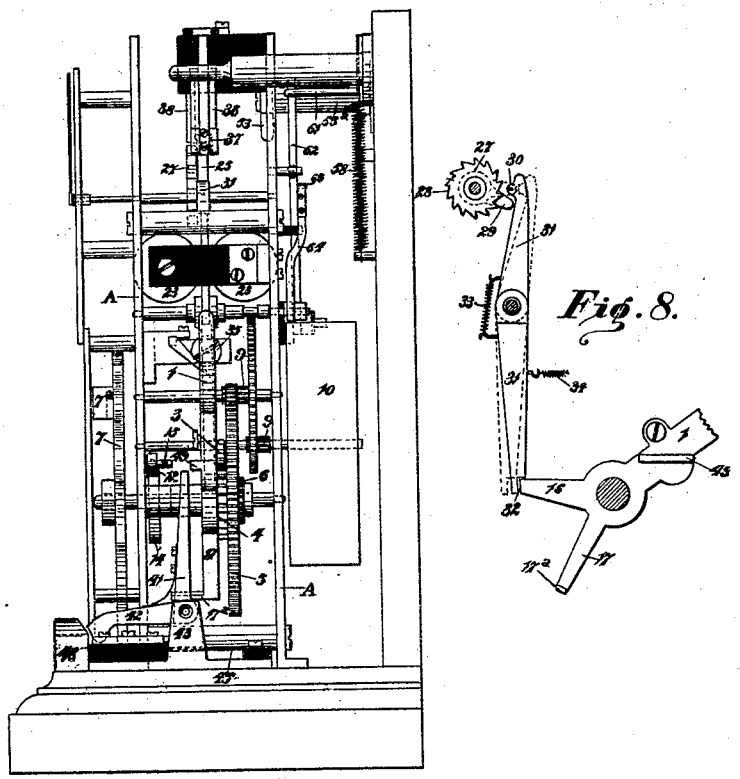
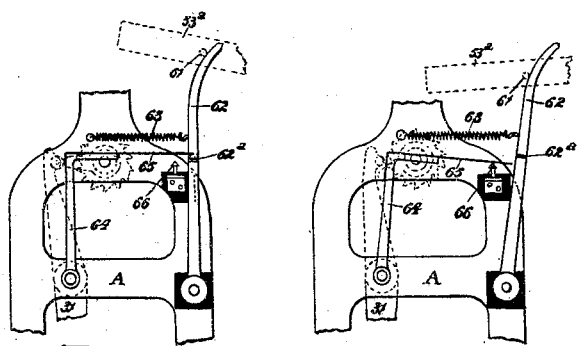

UNITED STATES PATENT OFFICE.

ERNEST GRAHAM GODFREE, OF HAMPTON, NEAR MELBOURNE, VICTORIA, AUSTRALIA.

ELECTROMECHANICAL SELECTOR.

997,990.  Specification of Letters Patent.  Patented July 18, 1911.

Application filed May 7, 1910. Serial No. 559,935.

*To all whom it may concern:*

Be it known that I, ERNEST GRAHAM GODFREE, a citizen of the Commonwealth of Australia, residing at Service street, Hampton, near Melbourne, in the State of Victoria and said Commonwealth, clerk, have invented a new and useful Electromechanical Selector, of which the following is a specification.

This invention has been devised in order to provide a simple and reliable electromechanical selector for use in connection with electro-signaling or for party line telephone systems, intercommunication systems, telegraphs and the like. It enables the operator at any one place or station in a circuit to select any other place or station in the same circuit. When in use all stations except the one selected and the one selecting may be cut off the line, thus giving the same facilities to each that would be obtained with the use of a separate line wire. The transmitting part of the instrument is mechanically interlocked with the receiving instrument in such a manner as to prevent any interruption while the line is engaged.

The transmitter consists, preferably, of a clock work or other motive mechanism so constructed that when released it operates suitable electrical contacts which in turn send electrical impulses through the circuit. The number of impulses sent depends on the insertion of a suitable plug or stop in any one of a number of holes provided for the purpose around the circumference of a dial.

The receiving part of the instrument comprises an electro-magnet and armature arranged to operate certain electrical contact making devices, a ratchet wheel having one shallow tooth, a rubbing spring contact, a detent retaining pawl and a swinging or fly contact, a local circuit consisting of the contact on the pawl of the armature, the spring contact, a battery and a bell.

In order that the invention may be readily understood it will be described with reference to the accompanying drawings, in which:—

Figure 1:
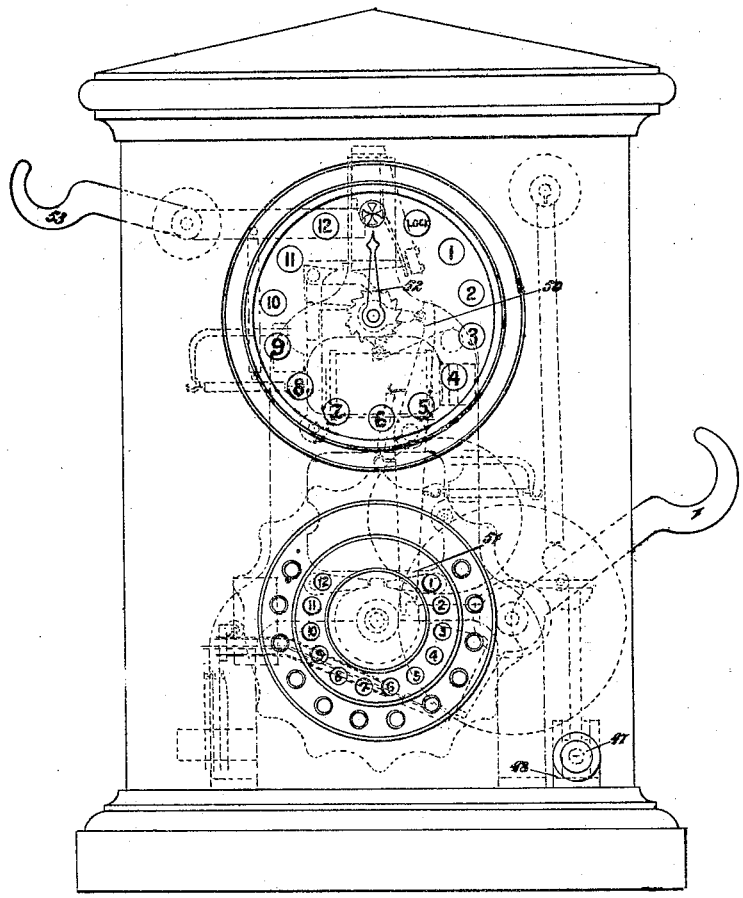
Figures 4, 5:
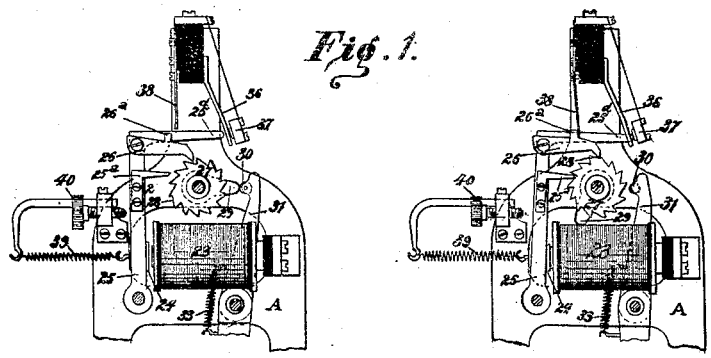
Figure 2:
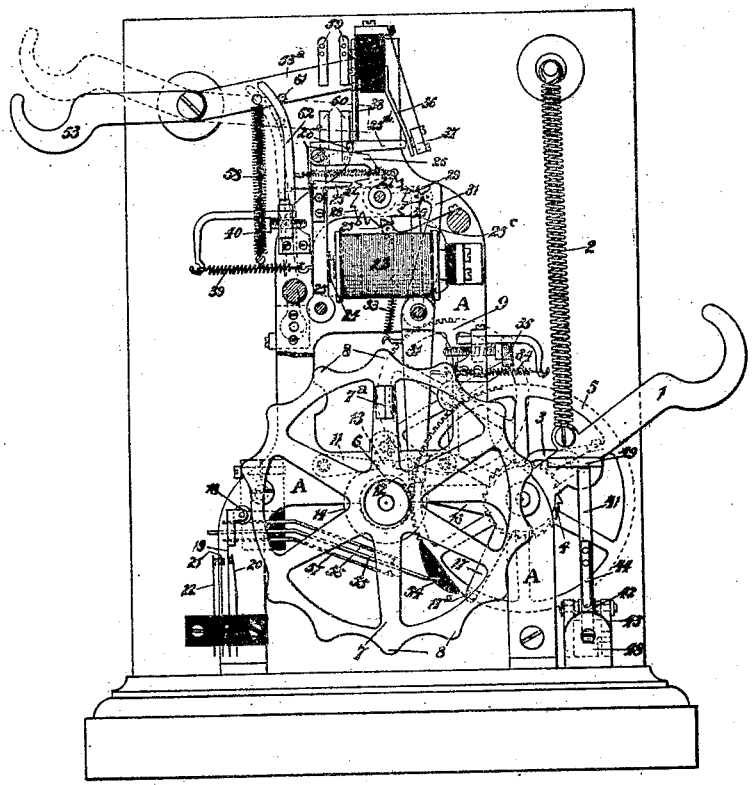
Figures 6, 7:
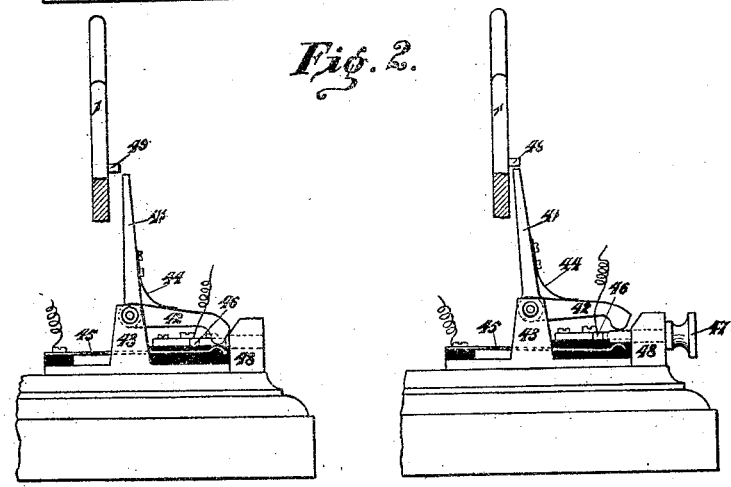
Figure 11:
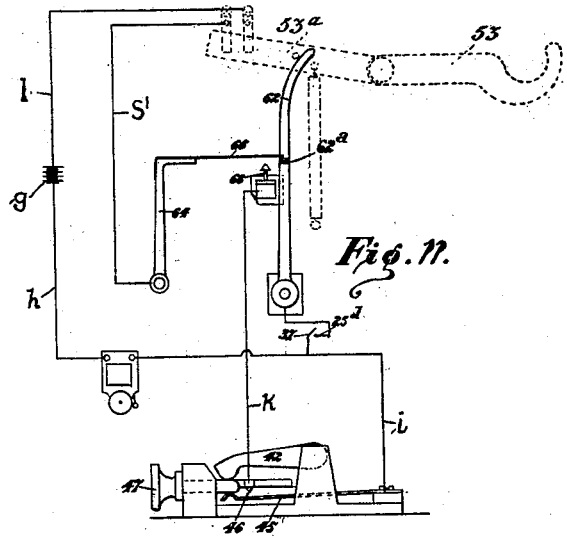
Figure 12:
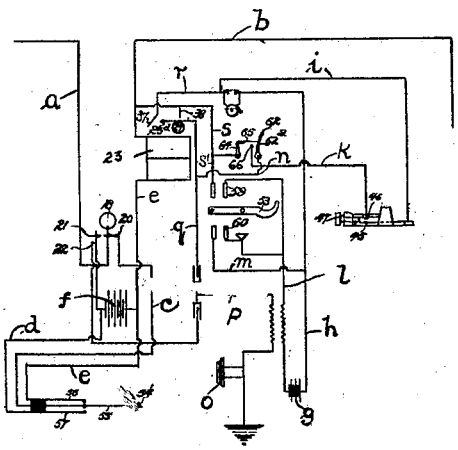

Figure 1 is a front elevation of the apparatus. Fig. 2 is a front elevation of the apparatus with the cover, dials and part of the framework removed showing the mechanism. Fig. 3 is a side elevation of the apparatus with part of the casing and a certain spring (2) removed for sake of clearness. Figs. 4 and 5 are front elevations of certain important details of the selector hereinafter described showing the parts in different positions. Figs. 6 and 7 are views illustrating certain locking mechanism hereinafter described. Fig. 8 illustrates details of certain other locking mechanism. Figs. 9 and 10 are views showing certain contact apparatus hereinafter described. Fig. 11 is a diagrammatic view illustrating the wiring of part of the apparatus. Fig. 12 is a diagrammatic view illustrating a system of wiring for this invention.

Like reference numerals indicate the same parts throughout the drawings.

The lever 1 which is illustrated throughout the drawings in its raised or normal position, is adapted to be pressed downwardly against the tension of the spring 2 shown in Fig. 2. A pawl 3 mounted on the lever 1, engages with a ratchet wheel 4, when said lever is released. This movement operates the gear wheel 5 which gearing with a smaller gear wheel 6 revolves the wheel 7. This latter has a number of projections 8 formed on its circumference corresponding to the number of stations on the line. The sprocket wheel 5 also drives another set of gear wheels 9 which in turn drive a fan 10 acting as a governor or controller.

The wheel 7 is automatically locked in its normal position by means of pawls 11 and 12 mounted on the supporting frame A of the apparatus and arranged to engage one on each side of a tooth or projection 13 secured to the shaft which carries the wheel 7. A stud or projecting pin 15 see Fig. 3 is formed or provided on the pawl 12. The lever 1 is formed with two arms 16 and 17 at its lower end. When the lever 1 is depressed the arms 16 and 17 rise and a lateral projection 17ᵃ of the arm 17 engages with the stud or projecting pin 15 on the pawl 12 and lifts said pawl out of engagement with the tooth or projection 13. When the lever 1 is released the spring 2 tends to return it to its normal position and thus operates the gearing which causes the wheel 7 to make one full revolution, or part of a revolution as hereinafter explained.

A small wheel or roller 18 on the upper end of a contact spring 19 bears against the periphery of the wheel 7, and during the movement of same makes and breaks certain electric circuits through other contact springs 20, 21, and 22 illustrated in Fig. 2. An electro-magnet 23 is normally in electrical communication with the contact 20 ready to receive any impulse sent along the line but as the wheel 7 revolves its projections 8 force back the contact spring 19 and cause it to make contact with the springs 21 and 22 thereby putting the line battery in circuit also the telephone transmitter and receiver at the sending station. An impulse is thus sent through the electro-magnet 23 when each projection 8 on the wheel 7 forces back said contact spring 19.

An armature 24 is attached to a pivotally mounted arm 25 which carries a pawl 26 adapted to engage with a selecting ratchet wheel 27. The teeth on said ratchet wheel correspond with the stations on the line plus two extra teeth one corresponding with the "locked" and one with the "zero" position of the instrument. An arm 25$^a$ also projects from the lever 25 and engages with the teeth of the ratchet wheel 27 in such a way as to prevent any over-running of said wheel while a roller 25$^b$ upon a spring 25$^c$ bears against the teeth of said wheel and holds it in position until it is moved on another tooth by the forward movement of the pawl 26. One tooth 28 on the ratchet wheel is formed shallower than the others, that is, about half as deep or less than the other teeth, as illustrated in Figs. 2, 4 and 5. The position of the shallow tooth 28 of the ratchet wheel 27 is different in each instrument. For instance the position of the tooth in number one instrument would be two movements from the normal position, that is when the indicator hand is at zero. At number two station the shallow tooth would be three movements and so on, the shallow tooth in each consecutive instrument being one movement behind that at the preceding station.

A projecting arm or cam 29 is attached to the ratchet wheel 27 and in its normal position bears against a roller 30 on the upper end of a pivotally mounted locking arm or lever 31 as illustrated in Figs. 1, 2, and 4. The locking arm or lever 31 is in halves pivotally connected together by a knuckle joint. The lower end 32 of the bottom half of the locking lever is adapted to engage the end of the arm 16 of the lever 1, as illustrated in Fig. 8, immediately the first impulse is sent through the electro-magnet 23 and the ratchet wheel 27 is moved around as indicated in Fig. 8. A spring 33 allows a certain amount of independent movement between the two halves of the lever and thus insures that no undue pressure will be exerted on the projecting arm 29 even if the lever 1 was being pressed down by the operator, at the time an impulse was going through his instruments: A spring 34 assists in returning said lever to its locking position, and a set screw 35 limits the movement of same.

The pivotally mounted arm 25 is formed with a laterally projecting arm or extension 25$^d$ the end of which passes through the bifurcated end of a check piece or rest 36 and contacts with a flying spring contact 37 each time the armature 24 is attracted by its electro-magnet 23. The contact 37 is carried at the lower end of a very light spring 37$^a$, the upper end of which is supported by a bracket 37$^b$ secured to a block 37$^c$ of insulating material. The check piece or rest 36 prevents the flying spring contact from making contact with the arm 25$^d$ when the instrument is at normal that is when the arm 25$^a$ is drawn back.

The pawl 26 contacts with a hit and miss contact 38 once each revolution of the ratchet wheel 27 that is, when the pawl 26 is raised higher than usual by means of the shallow tooth 28 as illustrated in Fig. 5. A spring 39 tends to return the arm 25 to its normal position and a set screw 40 limits the movement of said arm.

A locking device is provided so that when the instrument is not in use the lever 1 is locked and thus prevented from moving downwardly. This device consists of an upwardly projecting arm 41 and a horizontal arm 42 pivotally mounted in a bracket or support 43 on the base of the instrument under or near the lever arm 1. A spring 44 connects the two arms 41, 42 and yet allows a certain amount of "give" to the arm 41. A contact spring 45 tends to make contact at 46 as illustrated in Figs. 6 and 7.

To lock the lever 1 a plug 47 is inserted through an aperture in the plug holder 48 and forces the arm 42 upwardly. This arm bearing on the spring 44 causes the arm 41 to move back into position under a projection or stop 49 on the lever 1, at the same time breaking contact at 46. This is the normal position of the plug 47 when the instrument is not in use. The object of the spring 44 above referred to is to allow the arm 41 to "give slightly" if pressed against the lever 1 by inserting the plug 47 in the holder 48 before the stop 49 has been raised clear.

As illustrated in Fig. 1 the instrument has an upper and a lower dial 50 and 51 respectively. The top dial 50 in this instance is numbered from 1 to 12 and has in addition a zero or normal condition indicator and another indicator for a locking movement of the instrument. An indicator hand 52 controlled by the ratchet wheel 27 indicates whether the instrument is either at zero or locked, or connected with any particular station. The lower dial 51 has a number of holes formed in it, corresponding to the number of stations on the line. In the instance illustrated in the drawings there are supposed to be twelve stations. This dial is placed directly in front of the contact making wheel 7.

The normal condition of the instrument is with the receiver on the hook 53, the indicator pointing at zero, and the plug 47 in the support 48 locking the lever 1 as previously described. Figs. 2 and 4 illustrate the ratchet wheel 27 as it would be set at number four station when the indicator hand is pointing at zero. One of the instruments above described will be provided at each station and in their normal condition will all be at zero. Their mode of operation is as follows. Say for instance the operator in number one station desires to ring up number four station along the line. He removes his plug 47 from the plug holder 48, thus unlocking the lever 1, inserts said plug in hole number 4 in the lower dial 51, depresses said lever 1 to its full extent and then releases same. When the lever 1 is depressed the projection $17^a$ on the arm 17 in its upward movement bears against an ebonite or other insulator 54 on the contact spring 55, which normally is in contact with another spring contact 56 as illustrated in Figs. 2 and 12 of the drawings. The insulator 54 is situated in the path of travel of the arm 17 which thus forces the contact spring 55 down until contact is made with the lower contact spring 57. This closes a circuit when the instruments are properly connected and sends an impulse through the electro-magnet 23 causing the pawl 26 to operate the ratchet wheel 27 and turn it the extent of one tooth. The circuit so closed may be traced as follows on the diagrammatic view Fig. 12. From main line wire $a$ through contact 18, contact 20 wire $c$ to spring contact 55, to contact 57, through wire $d$ and battery $f$ to wire $e$, to magnet 23 and to main line wire $b$. This movement takes place right along the line and releases the locking levers 31 simultaneously in all the instruments thus allowing the springs 34 to pull the lower ends of said levers into engagement with the arms 16 of the operating levers 1 and thereby locking said levers in all the stations. This prevents any other instrument except the first from being operated until the operator in number one station (that is the selecting station) and the operator in the selected station (in this instance number four) have finished using their instruments either for conversation or signaling and have returned same to normal. When the lever 1 is released and returns to its normal position the projecting end $17^a$ of the arm 17 of said lever passes under the ebonite or other insulator 54 so as not to make another contact on the spring contact 57. The wheel 7 continues to revolve until a stop or projection $7^a$ upon it comes against the plug 47 projecting through number four hole. Before this happens four more impulses (corresponding to the number of contacts made by the roller 18 being forced out by the projections 8 on the periphery of the wheel 7 as it is revolved) are sent through the electro-magnet 23. This circuit may be traced as follows on Fig. 12. From line wire $a$ to contact arm 18, thence to contact 21, thence through local battery $f$ and wire $e$ to magnet 23 and to main line wire $b$. This means that five impulses have been sent through said magnet since the first movement of the lever 1. The ratchet wheel has therefore been moved on five teeth. This brings the shallow tooth 28 in number four station into position under the pawl 26 as illustrated in Fig. 5. The pawl 26 in that station is thereby raised high enough for the projection or contact piece $26^a$ to contact with spring contact 38, and the fly contact 37 coming to rest on the armature arm $25^d$ the local bell circuit is closed and the bell rings.

It will be understood that when the pawl 26 is moved forward and is raised by the shallow tooth 28 in any particular station it does not complete the local bell circuit until the fly contact 37 has swung back into its lowest position against the arm $25^d$, that is to say two conditions are necessary to complete this circuit. The pawl 26 must be raised by the shallow tooth and contact be made between the contact $26^a$ on the pawl 26 and the swinging or "hit or miss" contact 38, at the same time fly contact 37 must have had time to swing back into its contacting position against the arm $25^d$. These two conditions in the present instance only occur in number four station because that is the station in which the shallow tooth 28 will be in position to hold up the contact $26^a$ on the pawl 26. The local bell circuit in the called station may be traced in Fig. 12 as follows: from local battery $g$ by wire $l$ to contacts 59 which are bridged by the telephone hook or switch 53, thence to contact 38 to armature contact $25^d$ by way of contact $26^a$ on pawl 26, thence to flying contact 37 to bell and by wire $h$ to battery $g$. The hit and miss contact in the other stations being only momentary the fly contacts 37 do not have time to return to their contacting positions before the armature 24 and lever 25 have been drawn back and the hit and miss contact has been thereby broken. Numbers one and four machines are now in direct communication with each other, and the bell is ringing in number four station and will continue to ring until the receiver is taken off its hook, 53. The inner arm 53ª of the hook 53 will then be pulled down by the spring 58 from under two rubbing springs 59 of the bell circuit and will bridge the two springs 60 of the speaking circuit, or otherwise bring the speaking circuit into operation.

A pin 61 provided on the inner arm 53ª bears against a pivotally mounted lever arm 62 and forces it outwardly against the tension of a spring 63, when the receiver is taken off the hook 53. The spring 63 returns the arm 62 to normal when the receiver is replaced on the hook 45. These parts are illustrated in Figs. 9 and 10 as viewed from the rear with the back board of the instrument removed. An upwardly projecting arm 64 mounted on the spindle of the locking lever 31 carries a contact spring 65 arranged to contact with a terminal 66 when the receiver is taken off the hook 53 and the lever arm 62 is withdrawn by the pin 61 on the arm 53ª. The spring 65 thus makes contact with the terminal 66 and completes the speaking circuit when the two lower rubbing springs 60 are bridged by the arm 53ª. The contact stops 62ª on the arms 62 hold the contact springs 65 on all the instruments (except at the station selecting and at the station selected) out of contact with the terminals 66. As the contact spring 65 is carried by the spindle of the locking lever 31, it will be replaced upon the contact 66, when the apparatus is restored to normal condition and the locking lever is restored to its normal position shown in Fig. 10. Numbers one and four stations are now in direct communication with each other. The telephone circuit may be traced as follows in Fig. 12. From ground through the telephone instrument indicated at o, by wire p to the wire q, armature contact 25ᵈ, contact 37, wires r and i to contacts 45, 46, wire k to terminal 66, contact 65, wire s to line wire b. The local battery circuit for the telephone instrument is closed by hook or switch 53 bridging contacts 60, 60 and may be traced from one of said contacts by wire m to wire h to battery g, thence by wire l back to the other contact 60. At the close of conversation or signaling as the case may be the receiver is hung on the hook, 53, thus breaking the speaking circuit and making the bell circuit. This circuit may be traced on Fig. 11 from local battery g through wire l to contacts 59, 59 which are bridged by the hook 53, by wire s' to wire s, thence by contacts 65, 66 to wire k, through contacts 46, 45 to wire i, to bell, and by wire h to battery. The bell will continue to ring at the selecting station until the plug 47 is removed from the hole in the dial and is inserted in the plug support 48, thus breaking the contact between the spring 45 and the contact point 46, as illustrated in Figs. 6 and 7 and also in the wiring diagrams Figs. 11 and 12.

In the diagrammatic view, Fig. 12, a represents part of the main line circuit, leading into one of the stations, and b represents the main line wire leading out from the same. The line wire a is connected to the arm carrying the roller 18 which is normally in engagement with the contact 20. Contact 20 is connected by a wire c with the spring arm 55 carrying the insulator 54; a wire d connects the contact 57 with the contact 21 and a wire e connects contact 56 with the magnet 23 of the local station, which is also connected to the leading out wire b. A local battery f is connected in a shunt between the wires d and e. A wire h connects the bell with local battery g, wire i connects the bell with the spring 45, and contact 46 is connected by wire k with the terminal 66 hereinafter referred to. A wire l connects the battery g with one of the pairs of contacts 59 and 60, for throwing the battery into either the bell or telephone circuits according to the position of the telephone hook or lever 53. m is a wire leading from the other contact 60 to wire h and n is a wire from the contact 62, to wire q, thence to contact 25ᵈ. o represents the telephone connected to wire p grounded at one end and connected at the other to the wire q through the secondary or speaking circuit. The wire q connects contact 22 with contact 25ᵈ on the armature lever, a wire r connects the flying contact 37 with the bell circuit (as the wire i) and a wire s connects the contact 38 with the line wire b and with the arm 64, and a continuation s' from wire s extends to one of the contacts 59.

Fig. 11 represents diagrammatically a portion of the apparatus on a larger scale, illustrating the circuits connected therewith.

When the plug or stop of the transmitting instrument is withdrawn the lever 1 and the mechanism return to their normal condition with the indicator hand pointing to zero and a sufficient number of impulses are sent along the line to return all the instruments to their normal positions.

It will be seen from the foregoing that the transmitting and receiving instruments at each place are mechanically interlocked so that it is impossible for an operator in another station on the line to use his transmitting instrument while the line is engaged.

It will be understood by persons conversant with the art to which this invention relates that the electro-mechanical selector above described can be modified in various ways without departing from the essential features of the invention. For example reciprocating movements may be adapted in lieu of rotating ones and other forms of electrical contacts may be adapted in place of those shown and described in the drawings and specifications.

Having now fully described and ascertained my said invention and the manner in which it is to be performed, I declare that what I claim is:—

1. In an electro-mechanical selector, the combination with impulse transmitting mechanism, of a manually operated device, operatively connected therewith, a locking device for preventing the operation of said manually operated device, and comprising two pivoted arms, one of which is adapted to engage said manually operated device, and a yielding connection between said arms, yielding means for holding the locking device in its normal position, a step-by-step selecting device, electrically connected with the impulse transmitting mechanism and a device carried by said selecting device, for engaging the other of said arms of the locking device, when the selecting device is in normal position, and holding the locking device out of operative position.

2. In an electro-mechanical selector, the combination with impulse transmitting mechanism, of a manually-operated device operatively connected therewith, a locking device for preventing the operation of said manually operated device when in normal position, a step-by-step selecting device, electrically connected with the impulse transmitting mechanism, and a device carried by the said selecting device for engaging said locking device, when the selecting device is in normal position, and holding it out of engagement with the manually operated device, an auxiliary contact device for making a circuit through the step-by-step selecting mechanism, and a part connected with said manually operated device for actuating said contact device, operating said selecting device and releasing said locking device, before the impulse transmitting mechanism is actuated.

3. In an electro-mechanical selector, the combination with impulse transmitting mechanism, actuating devices for imparting a predetermined movement to said impulse transmitter, a manually operated device, movable freely in one direction, a pawl and ratchet mechanism connecting said manually operated device with the impulse transmitting mechanism and a yielding device for restoring said manually operated device to normal position, and actuating the impulse transmitting mechanism; a step-by-step selecting device, including a selecting wheel, adapted to be given a complete revolution by the impulse transmitting mechanism, a locking device for holding the manually operated device from movement, and a device carried by said selecting wheel for engaging said locking device when said wheel is in normal position and holding the locking device out of operative position, said impulse transmitting mechanism including a contact device in the path of a part connected with the manually operated device, electrically connected with the selecting mechanism for operating the same to release the locking device during the free movement of said manually operated device, and a removable and adjustable plug for arresting the impulse transmitting mechanism.

4. In an electro-mechanical selector, the combination with impulse transmitting mechanism, including a rotary circuit making and breaking disk, and contact devices coöperating therewith, actuating devices for imparting a complete revolution to said disk at each operation, and an auxiliary contact device adjacent to said disk, a step-by-step selecting device, in circuit with said disk controlled contacts and said auxiliary contact, and including a selecting wheel adapted to be given a complete revolution by the operation of said auxiliary contact device and said disk controlled contact devices, at each operation of the device, a switch in a call circuit, a locking device for the manually operated device, a spring for holding said locking device in operative position, a device carried by said selecting wheel for holding said locking device normally out of operation when the said wheel is in normal position, and a device carried by said wheel for operating said switch, and a part connected with said manually operated device for actuating said auxiliary contact device of the impulse transmitting mechanism to release the said locking device during the free movement of the manually operated device, before said actuating device is brought into operation, and a removable and adjustable plug for arresting said disk.

5. In an electro-mechanical selector, the combination with impulse transmitting mechanism, comprising among its members a rotary disk adapted to transmit a number of impulses equal to the number of stations on the line, said disk being provided with a locking projection, locking pawls engaging said projection on opposite sides thereof and holding said disk in normal position, actuating devices for imparting a complete revolution to said disk, a manually operated device for putting said actuating devices into operation, a part carried by said manually operated device for engaging one of said pawls to release the disk, and permit its operation by said actuating devices, and a removable and adjustable plug for arresting said disk in different positions.

6. In an electro-mechanical selector, the combination with impulse transmitting mechanism, actuating devices therefor a manually operated device, for calling into action said actuating devices, a step-by-step selecting mechanism, electrically connected with said impulse transmitting mechanism, a locking device for the manually operated device, yielding means for holding said locking device in operative position, a part connected with said selecting device, engaging normally said locking device and holding it in inoperative position, a second locking device for said manually operated device, a yielding device holding said locking device out of operative position, and a manually operated removable plug for holding said second locking device in operative position.

7. In an electro-mechanical selector, the combination with the impulse transmitting mechanism including a rotary disk and contact device operated thereby, gearing for imparting a complete revolution to said disk, a hand lever movable freely in one direction, pawl and ratchet mechanism connecting said lever with said gearing, an actuating spring connected with said lever, a lock for holding said disk in normal position, a locking device for holding said lever against movement, an electric selecting device, a part carried thereby for engaging said lever lock when the selecting device is in normal position and holding it in inoperative position, a second lock for said hand lever, normally held out of engagement therewith, a manually operated plug for forcing said second lock into engagement with said lever, a part carried by said hand lever for disengaging the lock for said disk, an auxiliary contact device electrically connected with the selecting device, and a part carried by said lever for operating said contact device to move the selecting device a step and disengage the lock engaging part from the lever locking device.

8. In an electro-mechanical selector, the combination with a manually operated device for actuating the same, a movable locking mechanism for said manually operated device normally out of operative position, and having a plug engaging part, and a removable plug for engaging said part to move said locking mechanism into operative relation with said manually operated device.

9. In an electro-mechanical selector, the combination with a manually operated device for actuating the same, of means for returning it to normal position, of a locking device normally out of operative position, and provided with a part for engaging the manually operated device and holding it from movement, and a removable plug for engaging said locking device and forcing it into operative position.

10. In an electro-mechanical selector, the combination with a manually operated device for actuating the same, of means for returning it to normal position, of a locking device normally out of operative position and comprising two pivoted arms and a yielding connection between said arms, one of said arms being movable into the path of a part connected with said manually operated device to lock it against movement, and a removable plug adapted to engage the other of said arms to move the locking device into operative position.

11. In an electro-mechanical selector, the combination with a manually operated device for actuating the same, and means for returning it to normal position, of a locking device normally out of operative position, provided with a part for engaging said manually operated device and a plug engaging part for operating the locking device, a plug socket adjacent to said plug engaging part, a circuit through the mechanism, two normally engaged contacts in said circuit, located adjacent to said plug socket, one of said contacts having a plug engaging part, and a removable plug for engaging said last named contact, for breaking said circuit, and having a part for engaging and operating the locking device when the plug is inserted in said socket.

12. In an electro-mechanical selector, the combination with impulse transmitting mechanism, of a step-by-step selecting device including a selecting wheel having ratchet teeth, one of which is of different depth from the others, a pawl engaging said teeth, and an electric device for operating said pawl, a hit-and-miss contact device for closing a call circuit, constructed to be thrown into operation when said pawl engages the distinctive ratchet tooth.

13. In an electro-mechanical selector, the combination with impulse transmitting mechanism, of a step-by-step selecting device, including a selecting ratchet wheel, provided with a device for closing a call circuit, a movable armature lever, and a pawl carried thereby and engaging said ratchet wheel, a flying contact in the call circuit, a contact device in said bell circuit carried by said armature lever for engaging the flying contact, and a check device for arresting the flying contact, said check device normally holding the flying contact out of electrical contact with the contact device on the armature lever.

14. In an electro-mechanical selector, the combination with impulse transmitting mechanism, of a step-by-step selecting device, including a selecting wheel, a pawl for operating the same, and an electric device for actuating said pawl, a call circuit, a contact in said circuit adapted to be actuated by said pawl to close the circuit, and a part carried by said selecting wheel for moving said pawl into position to engage the said contact.

15. In an electro-mechanical selector, the combination with impulse transmitting mechanism, of a step-by-step selecting device, including a selecting wheel, a pawl for operating the same, and an electric device for actuating said pawl, a call circuit, a contact in said circuit adapted to be actuated by said pawl to close the circuit, said selecting wheel having ratchet teeth engaged by said pawl, one of said teeth being of less depth than the others, and constructed to move said pawl into engagement with said contact.

16. In an electro-mechanical selector, the combination with an impulse transmitter, step-by-step selecting device, a call circuit called into operation by said selecting device, a telephone circuit, a switch, operated by the telephone receiver support for cutting the call circuit out of the line and cutting the telephone circuit into the line, a locking device for the impulse transmitting mechanism, a part carried by the selecting mechanism for engaging the said locking device when the selecting mechanism is in normal position and holding it out of operative position, a pair of normally separated contacts in the telephone circuit, one of said contacts being fixed and the other being movable and connected to said locking device, a movable part operatively connected with the telephone receiver support and a stop carried thereby and located normally in the path of said movable contact for holding it out of engagement with the fixed contact until the telephone receiver is removed from the hook.

In witness whereof I have hereunto set my hand in the presence of two witnesses.

ERNEST GRAHAM GODFREE.

Witnesses:
PERCY HEDGES,
WILLIAM ARMSTRONG.